United States Patent
Gupta et al.

(10) Patent No.: US 9,144,071 B2
(45) Date of Patent: Sep. 22, 2015

(54) METHODS AND APPARATUS FOR EFFECTIVE ALLOCATION OF ADAPTIVE RESOURCE PARTITIONING INFORMATION (ARPI) TO PICO ENHANCED NODE B BY MACRO ENHANCED NODE B IN HETEROGENEOUS NETWORK

(75) Inventors: Ajay Gupta, San Diego, CA (US); Osok Song, San Diego, CA (US); Madhavan Srinivasan Vajapeyam, San Diego, CA (US); Alan Barbieri, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 13/428,189

(22) Filed: Mar. 23, 2012

(65) Prior Publication Data

US 2012/0243488 A1    Sep. 27, 2012

Related U.S. Application Data

(60) Provisional application No. 61/467,226, filed on Mar. 24, 2011, provisional application No. 61/541,867, filed on Sep. 30, 2011.

(51) Int. Cl.
*H04W 4/00* (2009.01)
*H04W 72/04* (2009.01)

(52) U.S. Cl.
CPC .................................. *H04W 72/0426* (2013.01)

(58) Field of Classification Search
CPC ...... H04W 72/0426; H04W 4/00; H04B 7/14; H04J 1/10; H04J 3/08
USPC .................................................... 370/315, 329
See application file for complete search history.

(56) References Cited

U.S. PATENT DOCUMENTS

| | | | | |
|---|---|---|---|---|
| 7,477,914 B2 * | 1/2009 | Jalil et al. | ...................... | 455/524 |
| 8,165,597 B2 * | 4/2012 | Han et al. | ...................... | 455/453 |
| 8,442,547 B2 * | 5/2013 | Ahluwalia | ...................... | 455/453 |

(Continued)

FOREIGN PATENT DOCUMENTS

| | | |
|---|---|---|
| JP | 2009153133 A | 7/2009 |
| WO | WO-2011130438 | 10/2011 |

OTHER PUBLICATIONS

Bharucha et al., "Dynamic Resource Partitioning for Downlink Femto-to-Macro-Cell Interferece Avoidance" EURASIP Journal on Wireless Communications and Networking, vol. 2010, Article ID 143413, 12 pgs., Apr. 26, 2010.

(Continued)

*Primary Examiner* — Chandrahas Patel
*Assistant Examiner* — Lan Huong Truong
(74) *Attorney, Agent, or Firm* — Patterson & Sheridan, LLP

(57) ABSTRACT

Methods and apparatus for effectively allocating resource partitioning information (RPI) in a wireless communication network are provided. For certain aspects, a method for wireless communications generally includes receiving, at a first base station, such as a pico enhanced Node B (eNB), resource partitioning information (RPI) from at least one second base station, such as a macro eNB; determining one or more resources indicated in the RPI actually usable by the first base station; and sending, from the first base station to the at least one second base station, an indication of the actually usable resources.

68 Claims, 11 Drawing Sheets

(56) References Cited

U.S. PATENT DOCUMENTS

| | | | |
|---|---|---|---|
| 8,824,383 B2* | 9/2014 | Lindoff et al. | 370/329 |
| 2007/0081449 A1* | 4/2007 | Khan | 370/208 |
| 2007/0115878 A1* | 5/2007 | Ashish et al. | 370/329 |
| 2009/0040972 A1* | 2/2009 | Robson et al. | 370/329 |
| 2009/0161617 A1 | 6/2009 | Abedi | |
| 2009/0279493 A1* | 11/2009 | Gaal et al. | 370/329 |
| 2010/0008282 A1* | 1/2010 | Bhattad et al. | 370/312 |
| 2010/0081388 A1* | 4/2010 | Han et al. | 455/63.1 |
| 2010/0238883 A1 | 9/2010 | Borran et al. | |
| 2010/0267408 A1* | 10/2010 | Lee et al. | 455/509 |
| 2011/0103330 A1 | 5/2011 | Montojo et al. | |
| 2011/0194527 A1 | 8/2011 | Lin et al. | |
| 2011/0249642 A1 | 10/2011 | Song et al. | |
| 2012/0113843 A1* | 5/2012 | Watfa et al. | 370/252 |

OTHER PUBLICATIONS

Svensson et al., "the WINNER II Air Interface: Refined multiple access concepts", D4.6.1, Version 1.0, pp. 139, Nov. 30, 2006.
International Search Report and Written Opinion—PCT/US2012/030481—ISA/EPO—May 7, 2012.
Nokia Siemens Networks et al: "Enabling reporting of ABS resource status for eICIC purposes", 3GPP Draft; R3-103776 EICIC Load Reporting CR Revised3, 3rd Generation-Partnershfdr Oject(3 GPP), Mobile Competence Centre ; 650, Route Des Lucioles ; F-06921 Sophia-Antipolis Cedex ; France, vol. RAN WG3, no. Jacksonvill e y USA; 20101115, Nov. 30, 2010, XP050496961, [retrieved on Nov. 30, 2010].
Qualcomm Incorporated: More on resource status report for eICICM, 3GPP Draft; R3-110163, 3rd Generation Partnership Project (3GPP), Mobile Competence Centre ; 650, Route Des C. Documents Considered to Be Relevant Lucioles ; F-06921-Sophia-Anti Polis Cedex : France. Category* vol. RAN-WG, no. Dublin, Ireland; Jan. 11, 2011, XP050497160, [retrieved on Jan. 11, 2011].
Samsung: "CSI measurement restriction for macro-pico scenarios", 3GPP Draft; R1-106049 CSI Measurement Restriction for Macro Pico Scenarios, 3rd Generation Partnership Project (3GPP) , Mobile Competence Centre ; 650, Route Des Lucioles ; F-06921 Sophia-Anti Polis Cedex ; France, vol. RAN WG1, no. Jacksonville, USA; Nov. 10, 2010, XP050489772, [retrieved on Nov. 10, 2010].
France, vol. RAN WG1 No. Jacksonville, USA; 20101115, Nov. 10, 2010, XP050489772, [retrieved on Nov. 10, 2010].
"3rd Generation Partnership Project; Technical Specification Group Radio Access Network; Evolved Universal Terrestrial Radio Access Network (E-UTRAN) ; X2 application protocol (X2AP) (Release 10)" , 3GPP Standard; 3GPP TS 36.423, 3rd Generation Partnership Project (3GPP), Mobile Competence Centre ; 650, Route Des Lucioles ; F-06921 Sophia-Antipolis Cedex ; France, No. V10.0.0, Dec. 21, 2010, pp. 1-123, XP050462198, [retrieved on Dec. 21, 2010].

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

METHODS AND APPARATUS FOR EFFECTIVE ALLOCATION OF ADAPTIVE RESOURCE PARTITIONING INFORMATION (ARPI) TO PICO ENHANCED NODE B BY MACRO ENHANCED NODE B IN HETEROGENEOUS NETWORK

CROSS-REFERENCE TO RELATED APPLICATIONS

This application claims benefit of U.S. Provisional Patent Application Ser. No. 61/467,226, entitled "Methods and Apparatus for Effective Allocation of Adaptive Resource Partitioning Information (ARPI) to Pico Enhanced Node B by Macro Enhanced Node B in Heterogeneous Network" and filed Mar. 24, 2011, and U.S. Provisional Patent Application Ser. No. 61/541,867, entitled "Methods and Apparatus for Effective Allocation of Adaptive Resource Partitioning Information (ARPI) to Pico Enhanced Node B by Macro Enhanced Node B in Heterogeneous Network" and filed Sep. 30, 2011, both of which are herein incorporated by reference.

BACKGROUND

I. Field

Certain aspects of the present disclosure generally relate to wireless communication and, more specifically, to allocating resource partitioning information (RPI).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided. The method generally includes receiving, at a first base station, resource partitioning information (RPI) from at least one second base station; determining one or more resources indicated in the RPI usable by the first base station; and sending, from the first base station to the at least one second base station, an indication of the usable resources.

In an aspect of the disclosure, an apparatus for wireless communications is provided. The apparatus generally includes means for receiving RPI from at least one base station, means for determining one or more resources indicated in the RPI usable by the apparatus, and means for sending an indication of the usable resources to the at least one base station.

In an aspect of the disclosure, an apparatus for wireless communications is provided. The apparatus generally includes at least one processor and a memory coupled to the at least one processor. The at least one processor is generally configured to receive RPI from at least one base station, to determine one or more resources indicated in the RPI usable by the apparatus, and to send an indication of the usable resources to the at least one base station.

In an aspect of the disclosure, a computer-program product for wireless communications is provided. The computer-program product generally includes a computer-readable medium having code for receiving, at a first base station, RPI from at least one second base station; determining one or more resources indicated in the RPI usable by the first base station; and sending, from the first base station to the at least one second base station, an indication of the usable resources.

In an aspect of the disclosure, a method for wireless communications is provided. The method generally includes sending, from a first base station, RPI to a second base station; receiving an indication of one or more resources indicated in the RPI usable by the second base station; and determining whether to adjust the RPI based on the indication.

In an aspect of the disclosure, an apparatus for wireless communications is provided. The apparatus generally includes means for sending RPI to a base station, means for receiving an indication of one or more resources indicated in the RPI usable by the base station, and means for determining whether to adjust the RPI based on the indication.

In an aspect of the disclosure, an apparatus for wireless communications is provided. The apparatus generally includes at least one processor and a memory coupled to the at least one processor. The at least one processor is generally configured to send RPI to a base station, to receive an indication of one or more resources indicated in the RPI usable by the base station, and to determine whether to adjust the RPI based on the indication.

In an aspect of the disclosure, a computer-program product for wireless communications is provided. The computer-program product generally includes a computer-readable medium having code for sending, from a first base station, RPI to a second base station; receiving an indication of one or more resources indicated in the RPI usable by the second base station; and determining whether to adjust the RPI based on the indication.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
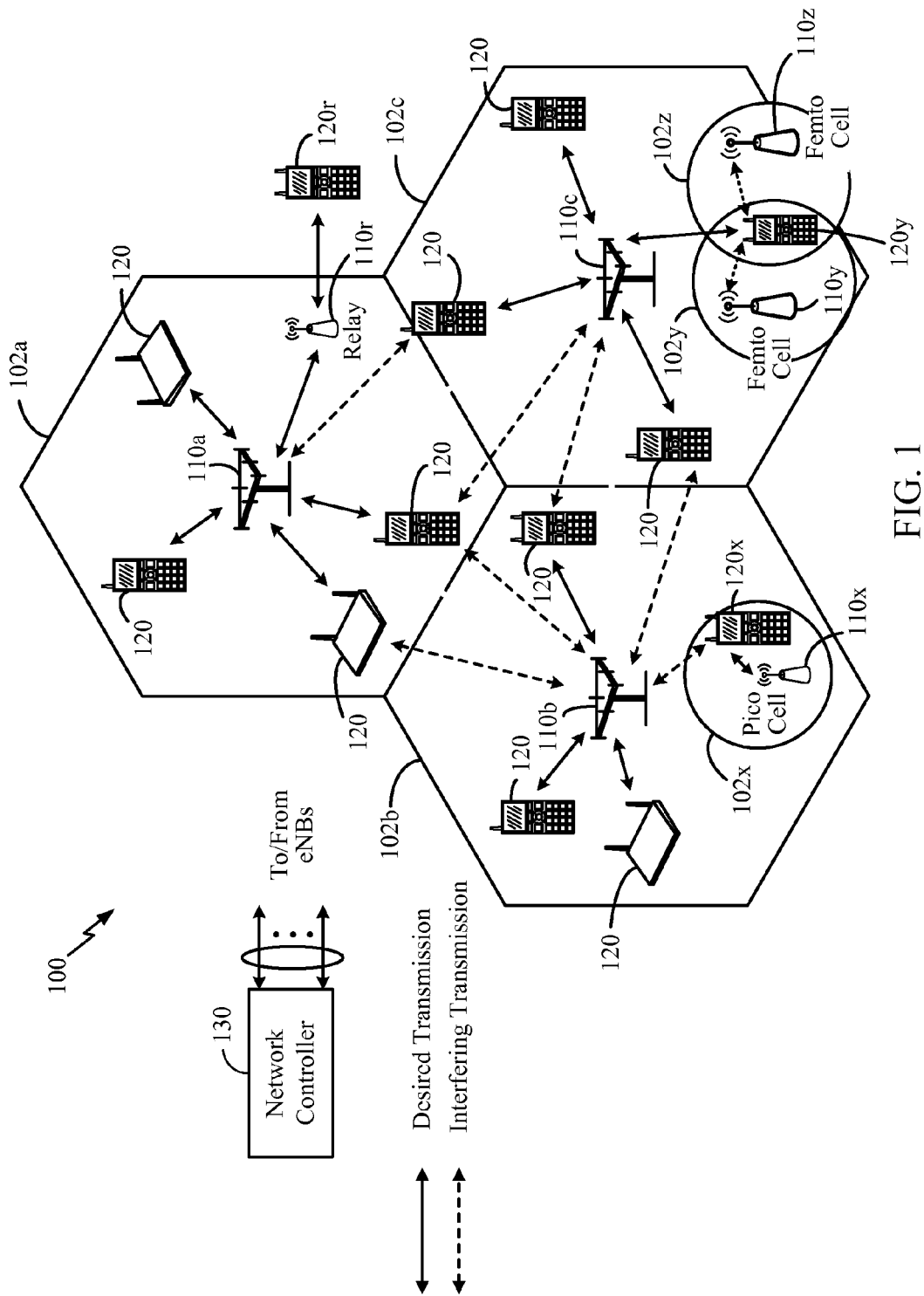
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
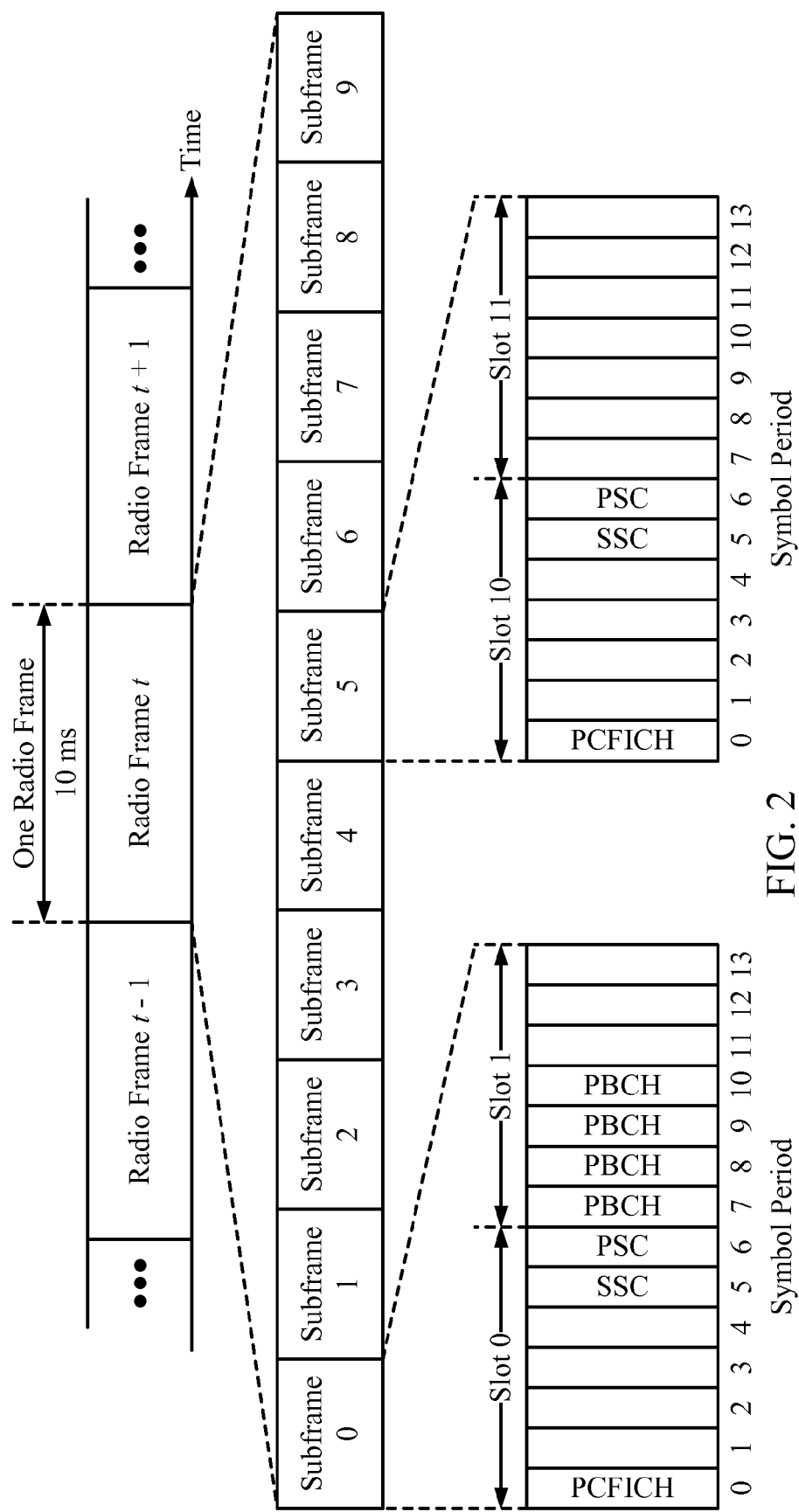
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
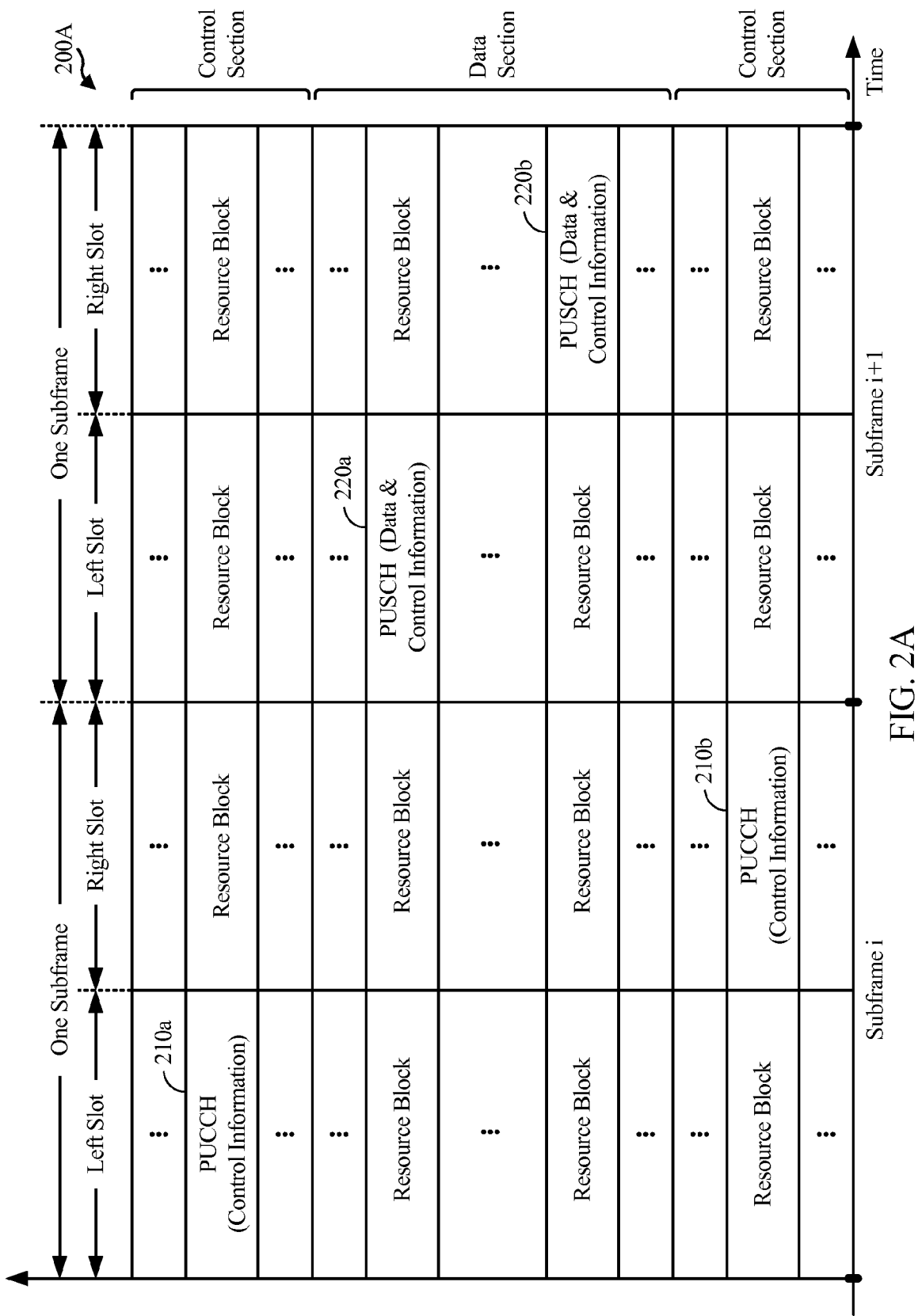
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
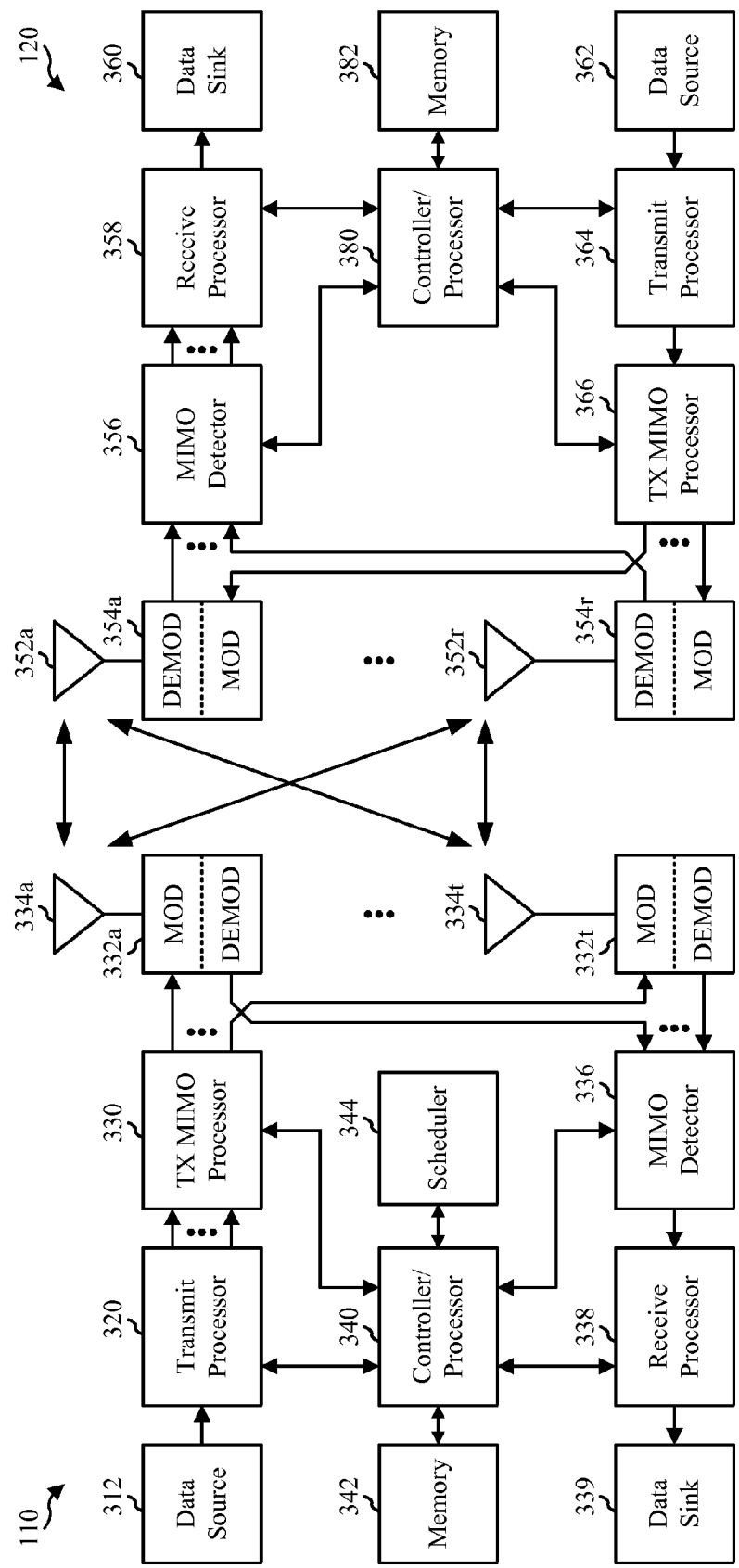
FIG. 3 shows a block diagram conceptually illustrating an example of a Node B in communication with a user equipment (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 800 in FIG. 8 and/or other processes for the techniques described herein. The memories 342 and 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 4:
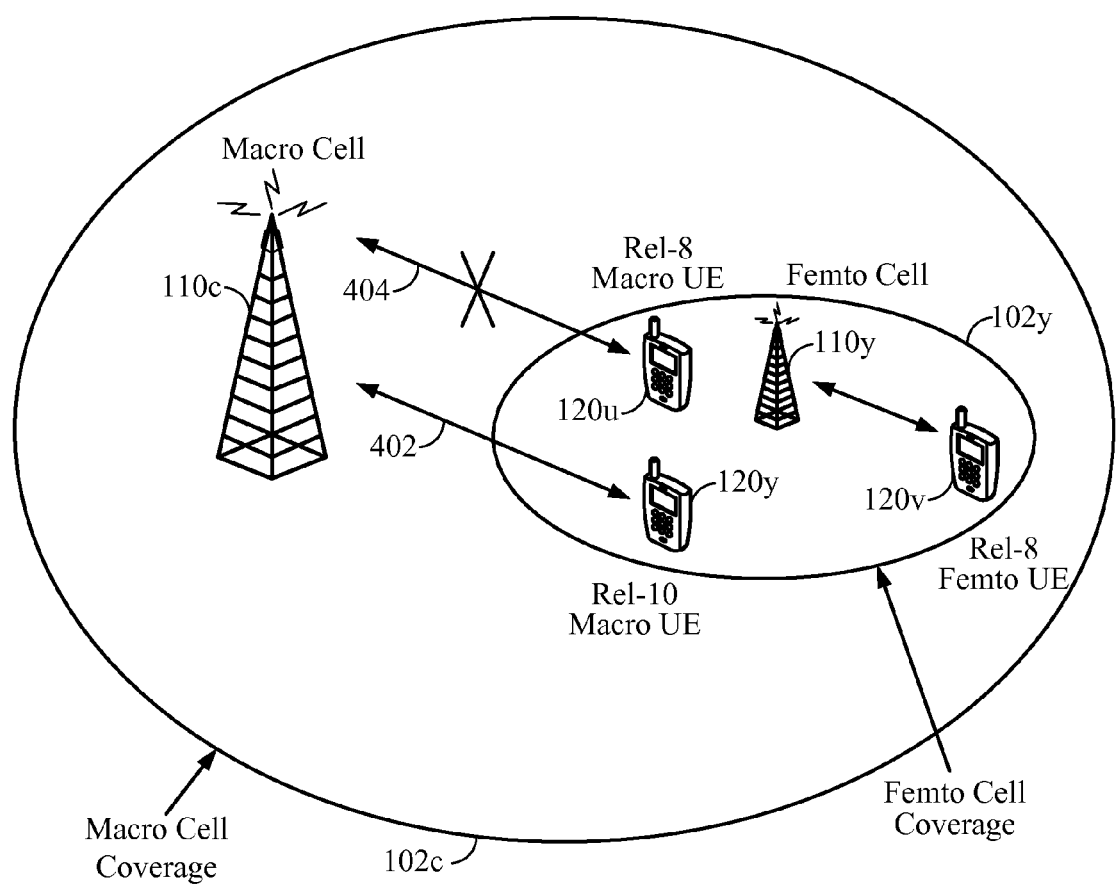
FIG. 4 illustrates an example heterogeneous network (HetNet) in accordance with certain aspects of the present disclosure.

FIG. 4 illustrates an example scenario where eICIC may allow a macro UE 120y supporting eICIC (e.g., a Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, networks may support eICIC, where there may be different sets of partitioning information. A first of these sets may be referred to as Semi-static Resource Partitioning information (SRPI). A second of these sets may be referred to as Adaptive Resource Partitioning information (ARPI). As the name implies, SRPI typically does not change frequently, and SRPI may be sent to the UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from a cell node B to a UE), a partitioning pattern may be mapped to a known subframe (e.g., a first subframe of each radio frame that has a system frame number (SFN) value that is a multiple of an integer N, such as 4). Such a mapping may be applied in order to determine resource-partitioning information (RPI) for a specific subframe. As an example, a subframe that is subject to coordinated resource partitioning (e.g., yielded by an interfering cell) for the downlink may be identified by an index:

IndexSRPI_DL=(SFN*10+subframe number)mod 8

For the uplink, the SRPI mapping may be shifted, for example, by 4 ms. Thus, an example for the uplink may be:

IndexSRPI_UL=(SFN*10+subframe number+4)mod 8

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned. Details of resource usage negotiation between base stations are not known to the UE.

Another possible set of parameters for SRPI may be the following:
U (Use): this value indicates the subframe has been cleaned up from the dominant interference to be used by this cell (i.e., the main interfering cells do not use this subframe;
N (No Use): this value indicates the subframe shall not be used;

X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g., macro cell, pico cell (with open access) and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically only known to the base stations, and a UE does not know it.

Figure 6:
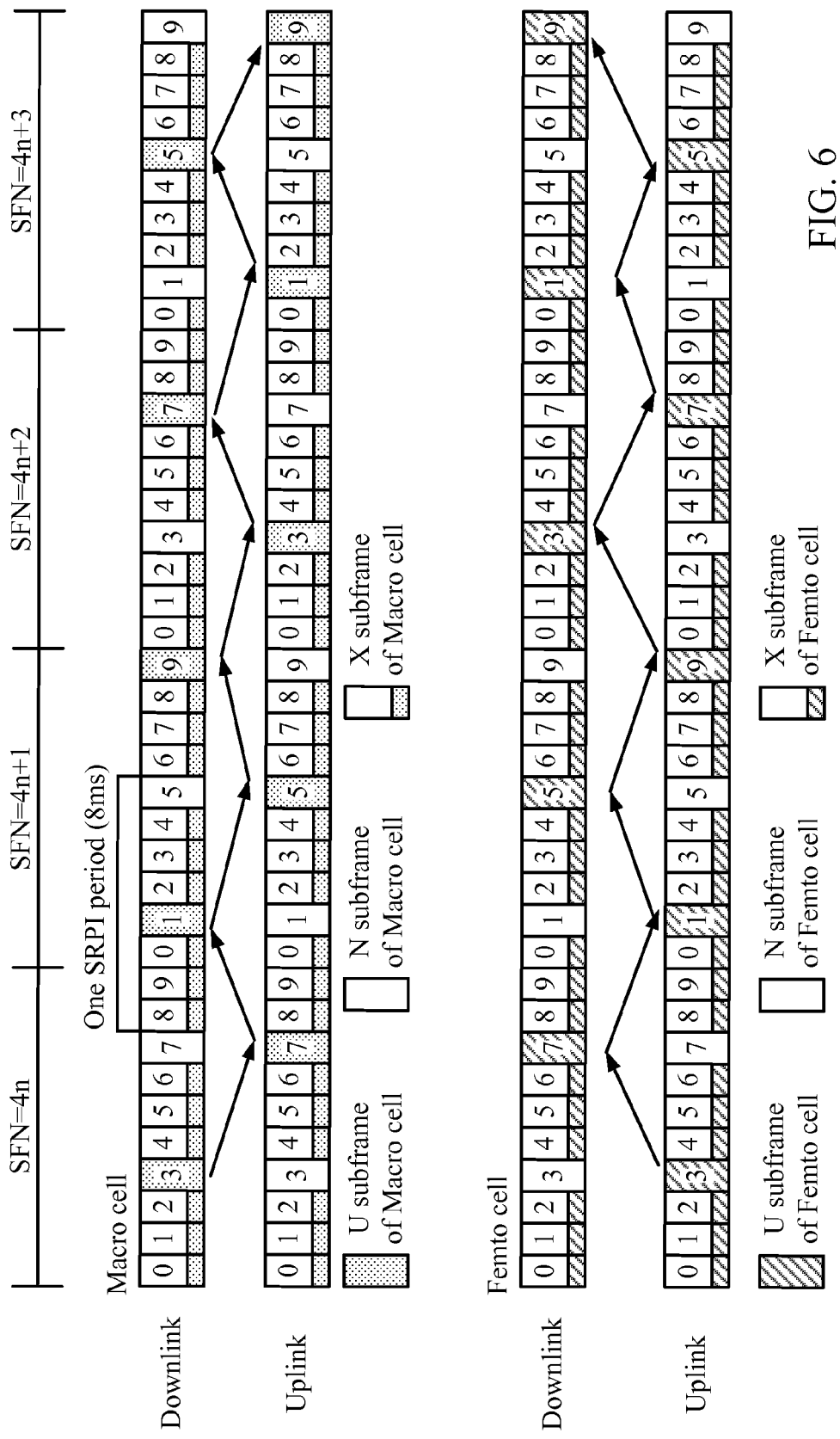
FIG. 6 illustrates example cooperative partitioning of subframes in a heterogeneous network in accordance with certain aspects of the present disclosure.

FIGS. 5 and 6 illustrate examples of SRPI assignment in the scenario with macro and femto cells. A U, N, X, or C subframe is a subframe corresponding to a U, N, X, or C SRPI assignment.

Example Effective Allocation of ARPI to Pico eNB by Macro eNB in Heterogeneous Network In a heterogeneous network (HetNet) environment with multiple macro eNBs interfering with a pico eNB, the pico eNB may interact with multiple macro eNBs to get a protected resource for a range expansion region. The pico eNB may provide a resource status report (RSR) to multiple macros eNBs and may get protected resource allocation from the multiple interfering eNBs. When serving UEs in the range expansion region, the pico eNB may only use those resources which are protected by all the interfering macro eNBs.

The current resource allocation mechanism may not involve feedback from the pico eNB regarding the actual resources being used. Even with the addition of feedback in the status report, there may be waste of resources allocated by the macro eNBs (e.g., when a specific resource is not protected by all macro eNBs). Currently, resource allocation by macro eNBs may not be coordinated between the macro eNBs. Resource allocation may also not be coordinated by the pico eNB between macro eNBs.

A remarkable exception may occur when some or all the interfering macro cells belong to the same eNB. Certain aspects of the present disclosure provide multiple options and enhancements to the current resource allocation mechanism in an effort to either reduce resource waste or to eliminate it by adding a resource negotiation phase before the resources are allocated by macro eNBs. The timing of resource status reports from multiple pico eNBs, evolved allocation, and retention priority (eARP) decision making may vary. For example, in one aspect, pico status reports and ARPI updates from macro eNBs may be synchronized. In another aspect, pico status reports may be spread out over time, and decisions may be made on the basis of available status and assigned ARPI.

In many practical network deployments, pico cells may experience interference by multiple sectors of the same macro eNB. For instance, if a pico eNB is roughly in the boundary area of two sectors of the same macro eNB, the pico eNB's range expansion UEs may be strongly interfered with by both sectors. Assuming the sectors have different physical cell identities (PCIs), the pico cell may identify the interfering sectors but might also realize that these sectors belong to the same eNB. In fact, X2 negotiation may be between eNBs rather than cells/sectors. A similar example may be the use of remote radio heads (RRHs), which may be seen as multiple cells which, although being physically separated, share the same eNB's box.

Regardless whether the pico eNB knows that multiple interfering cells belong to the same eNB or not, once the interfering macro eNB receives the status report messages, the macro eNB may know which ones of its sectors may be interfering with the pico cell. Either the pico eNB may send a single X2 message to the macro eNB including this information, or, more likely, the pico eNB may send multiple status reports (e.g., one status report per PCI). Sending a single X2 message to the macro eNB may be feasible if the pico realizes that the interfering cells belong to the same eNB. If the pico eNB sends multiple status reports, it may be up to the macro eNB to compare received status reports, each of the reports including a unique global cell identifier of the source node, and to determine which of the macro eNB's sectors may actually be interfering with the pico cell, based on the received X2 message.

For certain aspects, an optimization algorithm at the macro eNB may operate by jointly considering all of the macro's cells. Namely, a jamming matrix of size N×M may be constructed, where N is the number of cells this macro eNB supports and M is the number of pico eNBs in the macro eNB's coverage area. The $(n,m)^{th}$ Boolean element of the matrix may be true if sector n is a dominant interferer for pico m. As discussed above, the macro eNB may determine this by comparing all the received X2 status report messages, taking into account the source cell's identifiers. The optimization variables may be the N ARPIs (for example, one per macro sector). The objective function may take into account the most recent status reports from all M pico eNBs, so as to reduce resource waste due to mismatches of the ARPI proposed to the same picos from cells belonging to the same eNB.

In a general scenario, a pico cell may be strongly interfered by some cells belonging to the same macro eNB (e.g., two sectors belonging to some macro eNB) and by some other cells belonging to different macro eNBs. In this scenario, the above approach may be applied to deal with cells of the same eNB, whereas different interfering macro eNBs may use one of the options described below.

According to certain aspects of the present disclosure, a pico eNB may provide usable ARPI and resource status to a macro eNB. This provides a mechanism for the macro eNB to understand the actual resource usage at the pico eNB and may indicate to the macro eNB that the pico ARPI allocation may be restricted by another macro eNB. According to one aspect, a macro eNB may consider all pico eNBs in an ARPI allocation algorithm. If the ARPI-based allocation is greater than that usable by the pico eNB, the macro eNB may determine a new allocation by incrementing the previous usable allocation of the pico by 1.

According to certain aspects of the present disclosure, both the pico eNB and macro eNB may be overloaded. In this case, the result of the algorithm between the macro and pico eNBs may be the macro eNB giving the pico eNB more resources or no partitioning change. When the pico eNB's number of usable allocated resources (AU) is smaller than the macro eNB's number of allocated resources (AN), the macro eNB may set its AN to equal the pico eNB's AU incremented by 1. This may mean that the macro eNB may not take all the resources back even if the rest of the picos are under-loaded. Incrementing the pico's AU by 1 may ensure that the macro eNB is not a bottleneck.

As an alternative, in an effort to reduce waste, the macro eNB may increase the allocation for the pico eNB for only a certain amount of time. If, during this time, the pico eNB does not report an increase in usable ARPI, the macro eNB may take the allocated resource back. This process may repeat periodically as long as the result of the algorithm between the macro and pico eNBs is the macro eNB giving up more resources or no partitioning change and if the pico eNB's AU is smaller than the macro eNB's AN. Accordingly, if all interfering macro eNBs agree, this may impart more resources to the pico eNB. If a pico eNB does not use the new allocated resource (e.g., because of restriction(s) from other macro eNBs), the resource may be wasted for that macro eNB. However, this algorithm may still potentially benefit other pico eNBs under the same macro eNB. Overhead of wasted resources may be reduced by following a similar allocation algorithm by all macro eNBs.

According to another aspect, the macro eNB may send the actual ARPI and a new candidate ARPI to the pico eNB. The candidate ARPI may be a new message used to aid the negotiation between the pico eNB and multiple interfering macro eNBs. The candidate ARPI may inform the pico eNB of a possible larger allocation, if other macro eNBs agree. The ARPI algorithm at the macro eNB may compute the updated candidate ARPI and the updated ARPI, which may be sent to the pico eNB. For example, ARPI1 may be the updated ARPI, computed based on unrestricted pico eNBs, and ARPI2 may be the candidate ARPI, computed based on all pico eNBs. In general, the number of AUs in ARPI2 may be greater than or equal to the number of AUs in ARPI1. In case ARPI1 or ARPI2 changes, the macro eNB may send ARPI1 and ARPI2 to the pico eNB via the backhaul (e.g., over the X2 link).

The pico eNB may compute its usable ARPI1 (uARPI1) and usable ARPI2 (uARPI2) every time this pico eNB receives an ARPI update from an interfering macro eNB. The pico eNB may send reports to the macro eNB based on the intersection of all received reports from interfering macro eNBs. For example, when the number of AUs in uARPI2 is greater than or equal to the number of AUs in uARPI1, the pico eNB may inform the macro eNB that it may (be possible to) convert ARPI1 to uARPI2. The pico eNB may send this report as part of a status report or via a new message.

Figure 7:
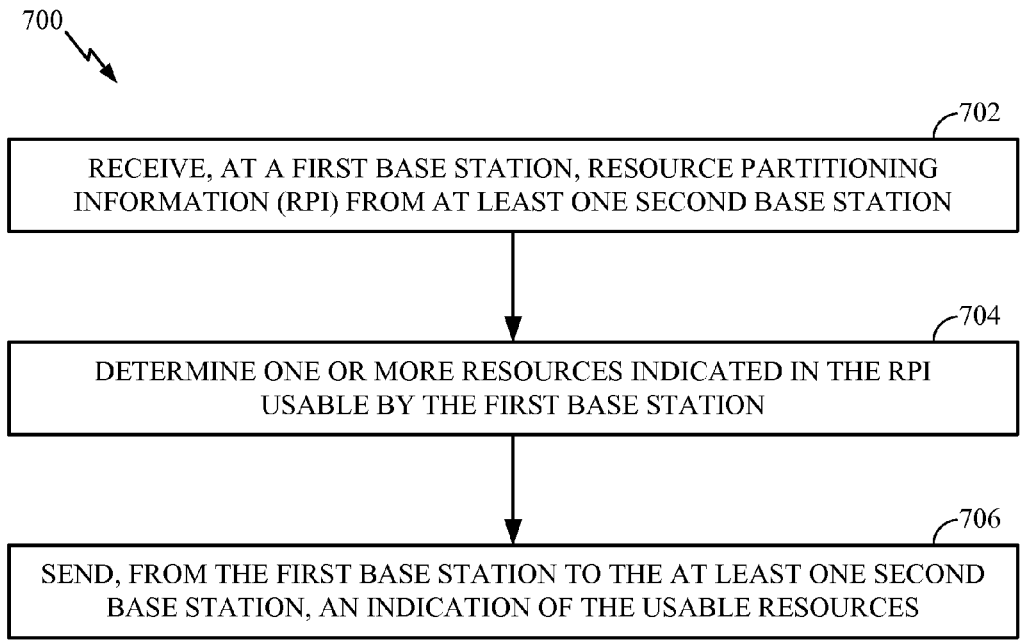
FIG. 7 is a flow diagram conceptually illustrating example operations for sending, from a first base station to at least one second base station, an indication of resources actually usable by the first base station, from the perspective of the first base station (e.g., a pico base station), in accordance with certain aspects of the present disclosure.

FIG. 7 illustrates example operations 700 in accordance with certain aspects of the present disclosure. The operations 700 may be performed, by example, by a first base station, such as a pico eNB. At 702, the first base station may receive time-domain resource partitioning information (RPI) from at least one second base station, such as at least one macro eNB. For certain aspects, the at least one second base station comprises two or more second base stations interfering with the first base station. For certain aspects, the first base station is a pico base station, and the at least one second base station comprises at least one macro base station. The RPI may be used for inter-cell interference management (e.g., eICIC). For certain aspects, the RPI comprises a bitmap of almost blank subframes (ABSs).

At 704, the first base station may determine one or more resources indicated in the RPI actually usable by the first base station, in an effort to protect terminals from inter-cell interference. For certain aspects, the at least one second base station may comprise two or more second base stations, and the first base station may determine the one or more resources by comparing the RPI received from the two or more second base stations and selecting a set of the resources common among the RPI received from the two or more second base stations.

At 706, the first base station may send, to the at least one second base station, an indication of the usable resources. The first base station may send the indication of the usable resources along with a resource status report (RSR).

For certain aspects, the first base station may determine whether a number of second resources is greater than a number of first resources actually usable by the first base station. For certain aspects, the first base station may receive another RPI from the at least one second base station, wherein the other RPI is based on the usable resources. For certain aspects, the first base station may send to the at least one second base station, an RSR before receiving the RPI from the at least one second base station at 702.

According to certain aspects, the RPI may include: (1) actual RPI based on resource status reports (RSRs) from unrestricted first base stations in a coverage area of the second base station and on indications of usable resources from restricted first base stations; and (2) candidate RPI based on RSRs from all first base stations in the coverage area of the second base station, regardless of restriction. The first base station may determine the one or more resources at 704 by determining one or more first resources indicated in the actual RPI usable by the first base station and by determining one or more second resources indicated in the candidate RPI usable by the first base station.

For certain aspects, the operations 700 may further include the first base station determining whether a number of the second resources is greater than a number of the first resources usable by the first base station. The indication of the usable resources may include an indication of the second resources. For certain aspects, the first base station may send the indication at 706 by sending the indication of the second resources if the number of the second resources is greater than the number of the first resources. The first base station may send the indication of the second resources in an RSR.

According to certain aspects, the first base station may periodically receive the RPI at 702 from the at least one second base station. For certain aspects, the first base station may receive the RPI from one of the at least one second base station at substantially the same time as another RPI from a different one of the at least one second base station. The other RPI may be smaller than the RPI received from the one of the at least one second base station. For certain aspects, the indication of the usable resources is smaller than the RPI received from the one of the at least one second base station. For certain aspects, receiving the RPI from the one of the at least one second base station and the other RPI from the different one of the at least one second base station occurs within a time window. For certain aspects, the operations 700 further include the first base station receiving an indication of the time window from a central network component or from the at least one second base station. For certain aspects, receiving the RPI and the other RPI includes receiving the RPI from the one of the at least one second base station at a first time, waiting the time window starting from the first time to receive any other RPIs from the at least one second base station, and receiving the other RPI from the different one of the at least one second base station at a second time within the time window.

According to certain aspects, the operations 700 further include the first base station sending, to the at least one second base station, another indication for the at least one second base station to redetermine the RPI. Sending the other indication may comprise periodically sending the other indication, wherein a first periodicity of sending the other indication is larger than a second periodicity of sending an RSR. For certain aspects, the other indication includes at least one of a usable almost blank subframe (ABS) pattern, a flag in an ABS status information element (IE), or an ABS without an ABS pattern information IE. For certain aspects, the flag in the ABS status IE indicates that the first base station prefers to retain the resources released by the at least one second base station.

Figure 8:
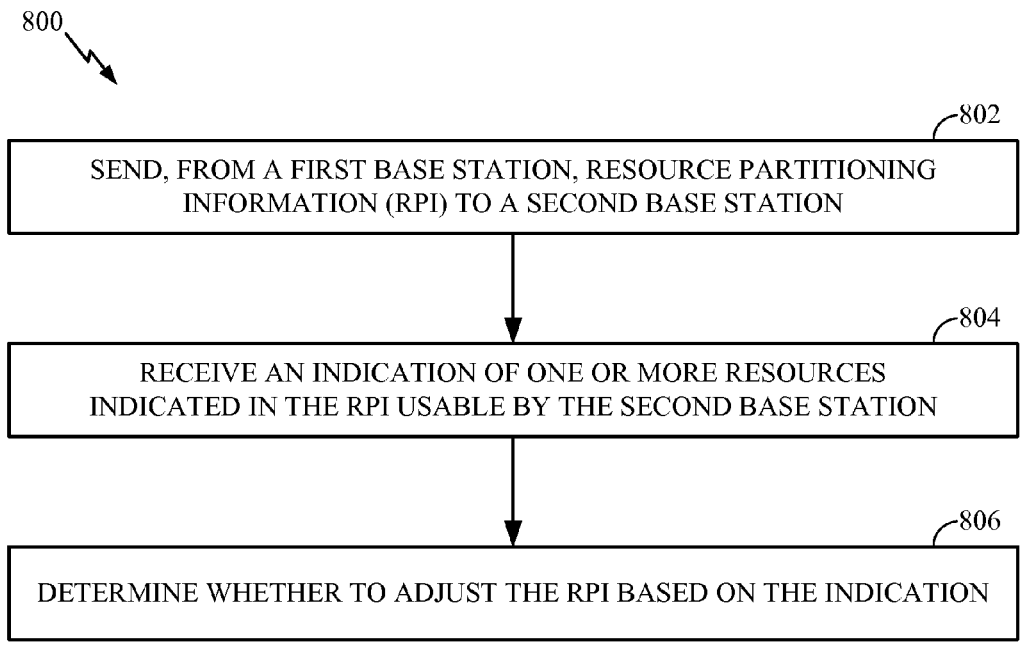
FIG. 8 is a flow diagram conceptually illustrating example operations for determining whether to adjust the RPI allocated by a first base station based on resources actually usable by a second base station, from the perspective of the first base station (e.g., a macro base station), in accordance with certain aspects of the present disclosure.

FIG. 8 illustrates example operations 800 in accordance with certain aspects of the present disclosure. The operations 800 may be performed, for example, by a first base station, such as a macro eNB. At 802, the first base station may send resource partitioning information (RPI) to a second base station, such as a pico eNB in the coverage area of the first base station.

At 804, the first base station may receive an indication of one or more resources indicated in the RPI actually usable by the second base station. For certain aspects, the first base station may receive the indication of the usable resources along with a resource status report (RSR). At 806, the first base station may determine whether to adjust the RPI based on the indication.

For certain aspects, the first base station may determine whether another base station is interfering with the second base station based on the indication of the actually usable resources. For certain aspects, the first base station may adjust the RPI if the number of usable resources is smaller than the number of allocated resources. For certain aspects, the first base station may adjust the RPI by allocating resources indicated in the adjusted RPI such that the number of allocated resources equals the number of the resources indicated in the candidate RPI usable by the second base station. For certain aspects, the first base station may receive a resource status report (RSR) before sending the RPI to the second base station at 802. For certain aspects, the first base station may send another RPI, wherein the other RPI is based on the usable resources.

According to certain aspects, the first base station may determine whether to adjust the RPI by determining a number of allocated resources indicated in the RPI, determining a number of the usable resources, and determining whether the number of the usable resources is smaller than the number of the allocated resources. For certain aspects, the operations 800 may further include the first base station adjusting the RPI if the number of the usable resources is smaller than the number of the allocated resources. The first base station may adjust the RPI by incrementing the number of the usable resources by 1 and allocating resources indicated in the adjusted RPI such that the number of the allocated resources equals the incremented number of the usable resources.

According to certain aspects, the RPI may include: (1) actual RPI based on RSRs from unrestricted second base stations in a coverage area of the first base station and on indications of usable resources from restricted second base stations; and (2) candidate RPI based on RSRs from all second base stations in the coverage area of the first base station, regardless of restriction. For certain aspects, the first base station may send the RPI at 802 by sending the actual and the candidate RPIs if either the actual RPI or the candidate RPI has changed from a previous value. The indication may include an indication of the resources of the candidate RPI usable by the second base station. For certain aspects, a number of the resources indicated in the candidate RPI usable by the second base station is greater than a number of the resources indicated in the actual RPI usable by the second base station. For certain aspects, the operations 800 may further include the first base station adjusting the RPI by allocating resources indicated in the adjusted RPI such that the number of the allocated resources equals the number of the resources indicated in the candidate RPI usable by the second base station.

According to certain aspects, the first base station may periodically send the RPI to the second base station at 802. For certain aspects, the first base station may send the RPI to the second base station at substantially the same time as a third base station is sending another RPI to the second base station. For certain aspects, the operations 800 may further comprise the first base station coordinating with the third base station to send the RPI to the second base station at substantially the same time as the third base station (i.e., the other base station) is sending the other RPI. For certain aspects, the operations 800 may further include the first base station receiving a message from a central network component such that the RPI is sent to the second base station at substantially the same time as the third base station is sending the other RPI.

According to certain aspects, the operations 800 may further comprise the first station receiving another indication for the first base station to redetermine the RPI, redetermining the RPI based on the reception of the other indication, and sending the redetermined RPI to the second base station. For certain aspects, the first base station may periodically receive the other indication. The other indication may comprise at least one of a usable almost blank subframe (ABS) pattern, a flag in an ABS status information element (IE), or an ABS without an ABS pattern information IE. For certain aspects, the first base station may decide, based on the reception of the other indication, not to retract a resource from the redetermined RPI if the first base station has available resources.

Figure 9:
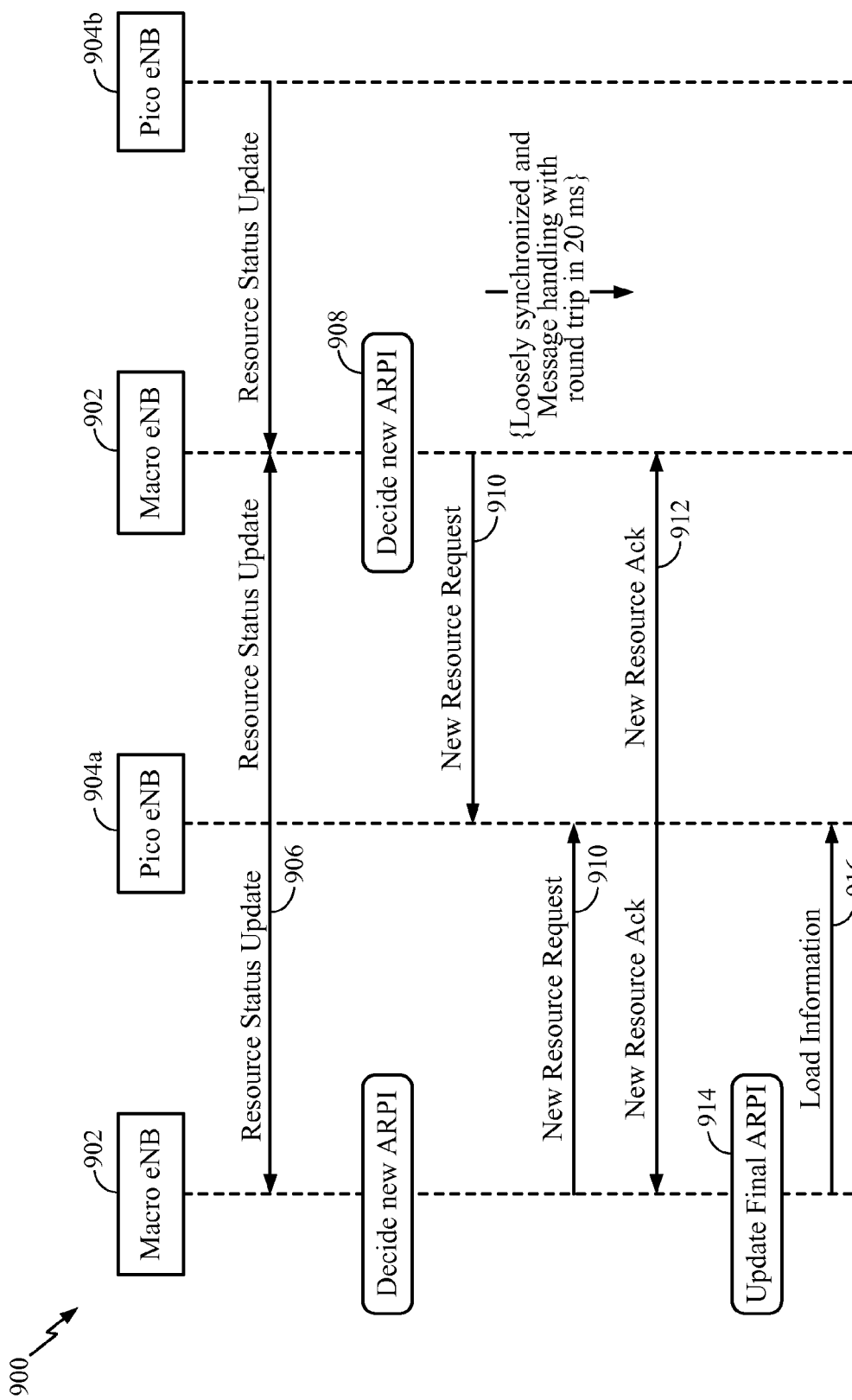
FIG. 9 illustrates an example call flow for pre-negotiation between macro enhanced Node B (eNBs) and pico eNBs, in accordance with certain aspects of the present disclosure.

FIG. 9 illustrates an example call flow diagram 900 for pre-negotiation between macro eNBs 902 and pico eNBs 904a, 904b in accordance with aspects of the present disclosure. According to certain aspects, pre-negotiation between the macro eNBs 902 and pico eNBs 904a, 904b may take place before allocation ARPI may be assigned by the macro eNB 902. During the negotiation phase, the pico eNBs 904a, 904b may send resource status updates 906 to the macro eNBs 902. The negotiation phase need not be performed when a pico eNB is interacting with only a single macro eNB. In other words, the negotiation phase may only be performed for certain aspects when pico eNBs 904a, 904b are interacting with multiple macro eNBs 902. The pico eNBs 904a, 904b may indicate this to the macro eNBs 902 in the resource status update 906.

The macro eNBs 902 may determine ARPI at 908 including all pico eNBs 904a, 904b (including restricted pico eNB 904a) and may send a new resource request 910 to the restricted pico eNB 904a based on the ARPI. For certain aspects, the assumption or condition may be that all macro eNBs 902 may be reporting the ARPI at more or less the same time. After the restricted pico eNB 904a receives the ARPI from all of the macro eNBs 902, the restricted pico eNB 904a may report a new resource acknowledgment 912 to the macro eNBs 902. According to certain aspects, the new resource acknowledgment 912 may be a usable ARPI. During the resource allocation phase, depending on the feedback from the restricted pico eNB 904a, the macro eNB 902 may decide to update the final ARPI at 914, which may involve decreasing or keeping the allocation of ARPI the same. The macro eNB 902 may send the final ARPI at 916 to the restricted pico eNB 904a.

For certain aspects, if a macro eNB has available resources, this macro eNB may periodically send a larger ARPI to the pico eNB. All macro eNBs may coordinate this procedure such that the update is sent at roughly the same time, or at least within a time window ($\Delta t$). Such synchronization between macro eNBs to grant additional resources may occur via OAM (operations, administration, and maintenance), a message exchange between the macro eNBs, a message from a central network component (e.g., a central server) sent to the macro eNBs, or any other suitable technique. Once the pico eNB receives ARPI from one macro eNB, the pico eNB may wait the extent of the time window to receive any additional ARPI from any other macro eNBs. In this manner, the pico eNB will know to wait during the time window to ensure that all ARPI is received before determining the usable resources and responding to the macro eNBs. For other aspects, the pico eNB may know the start of the time window and listen for any received ARPI during this window, without waiting to receive ARPI from a macro eNB before starting the time window.

Figure 10A:
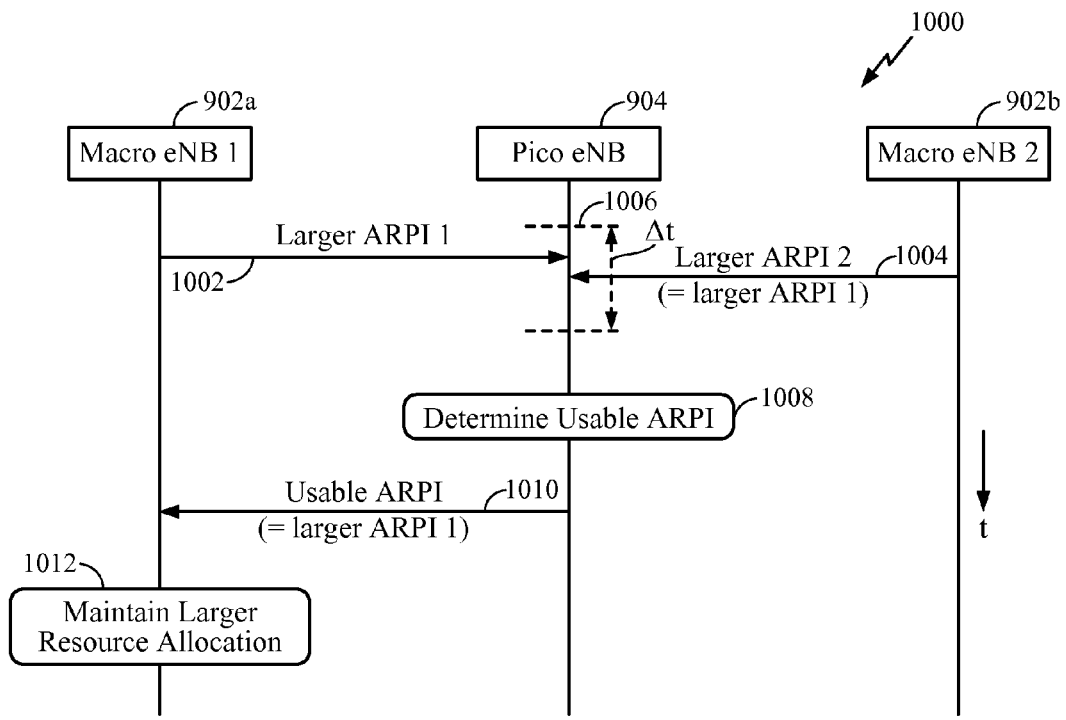
FIGS. 10A and 10B illustrate example call flows for sending synchronized updated RPI from one or more macro eNBs to a pico eNB, in accordance with certain aspects of the present disclosure.

In cases where the pico eNB is able to use the larger ARPI because all its neighbor macro eNBs sent this pico eNB a larger ARPI, the pico eNB may respond with an actually used ARPI matching the larger allocation. The example call flow 1000 in FIG. 10A illustrates these cases. A first macro eNB 902a (Macro eNB 1) may send a larger ARPI1 at 1002 to the pico eNB 904 at substantially the same time as a second macro eNB 902b (Macro eNB 2) transmits a larger ARPI2 (matching the larger ARPI1) at 1004. The receipt of the ARPI may most likely occur within a time window ($\Delta t$) 1006. The pico eNB 904 may then determine at 1008 that the usable ARPI can be as large as the larger ARPI1 (=the larger ARPI2) and may indicate this to at least Macro eNB 1 at 1010. At 1012, Macro eNB 1 may maintain the larger resource allocation (larger ARPI1) since the pico eNB is able to use this larger allocation.

Figure 10B:
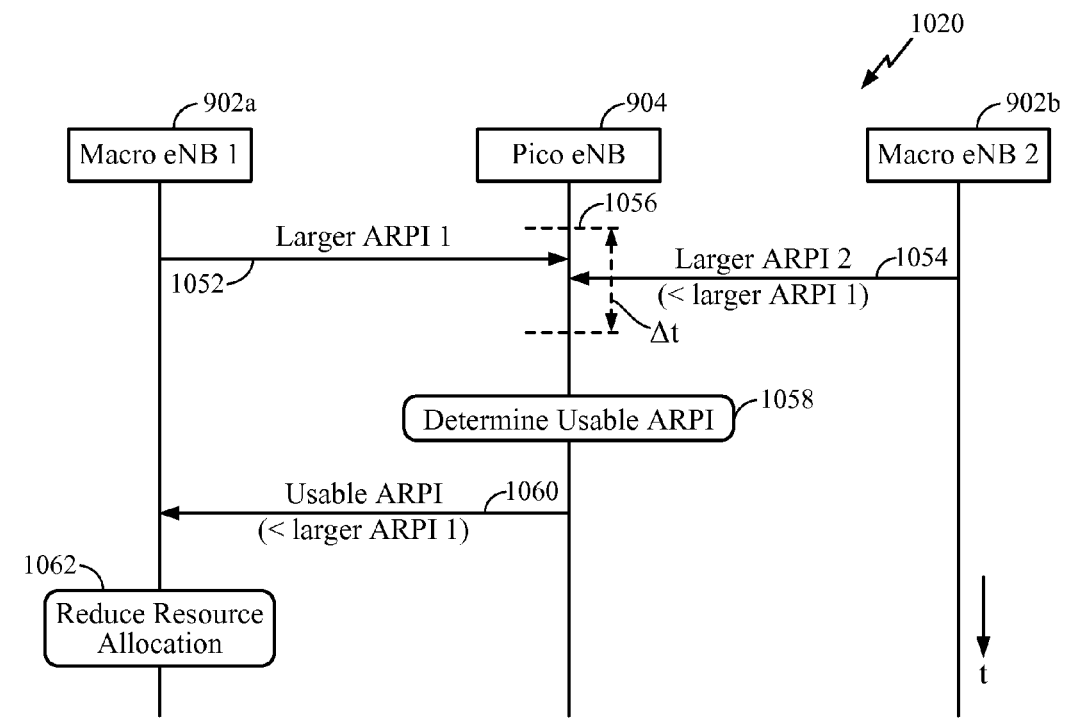

Otherwise (i.e., if Macro eNB 2 sent an ARPI smaller than that sent by Macro eNB 1), the pico eNB may respond to Macro eNB 1 with a smaller actually used ARPI than the received allocation. This may cause Macro eNB 1 to scale back the allocation and avoid waste. The example call flow 1020 in FIG. 10B illustrates this alternative scenario, where Macro eNB 1 may send a larger ARPI1 at 1052 to the pico eNB at substantially the same time as Macro eNB 2 transmits a larger ARPI2 (smaller than the larger ARPI1) at 1054. The receipt of the ARPI at the pico eNB may occur within a time window ($\Delta t$) 1056. The pico eNB 904 may then determine at 1058 that the usable ARPI cannot be as large as the larger ARPI1 and may indicate this to Macro eNB 1 at 1060. At 1062, Macro eNB 1 may then reduce its resource allocation to avoid waste (i.e., allocating resources for the pico eNB that the pico eNB is unable to use).

According to other aspects, this synchronization burden may be moved to a pico eNB. At some periodic intervals, a pico eNB may send a usable ABS (almost blank subframe) pattern as empty (note that empty is not the same as all zeros, and may be attained by omitting the used ARPI field in the message). This may signal to the macro eNBs to recalculate their ARPI allocations. Thus, the empty ABS pattern may function as a reset message. If the recalculated allocations from all the macro eNBs are larger than the previous allocation, then the pico eNB may be able to use this larger allocation. For certain aspects, a pico eNB may include an optional flag in the ABS status information element (IE) to indicate to the macro eNB not to restrict the ABS allocation due to the usable ABS pattern, when the pico eNB considers it could be in a dead lock situation. Another option includes sending the usable pattern to be greater than what was provided by the macro eNB. In this manner, the macro eNB may get the indication that the pico eNB is no longer restricted by another macro eNB and may provide more interlaces.

Figure 11:
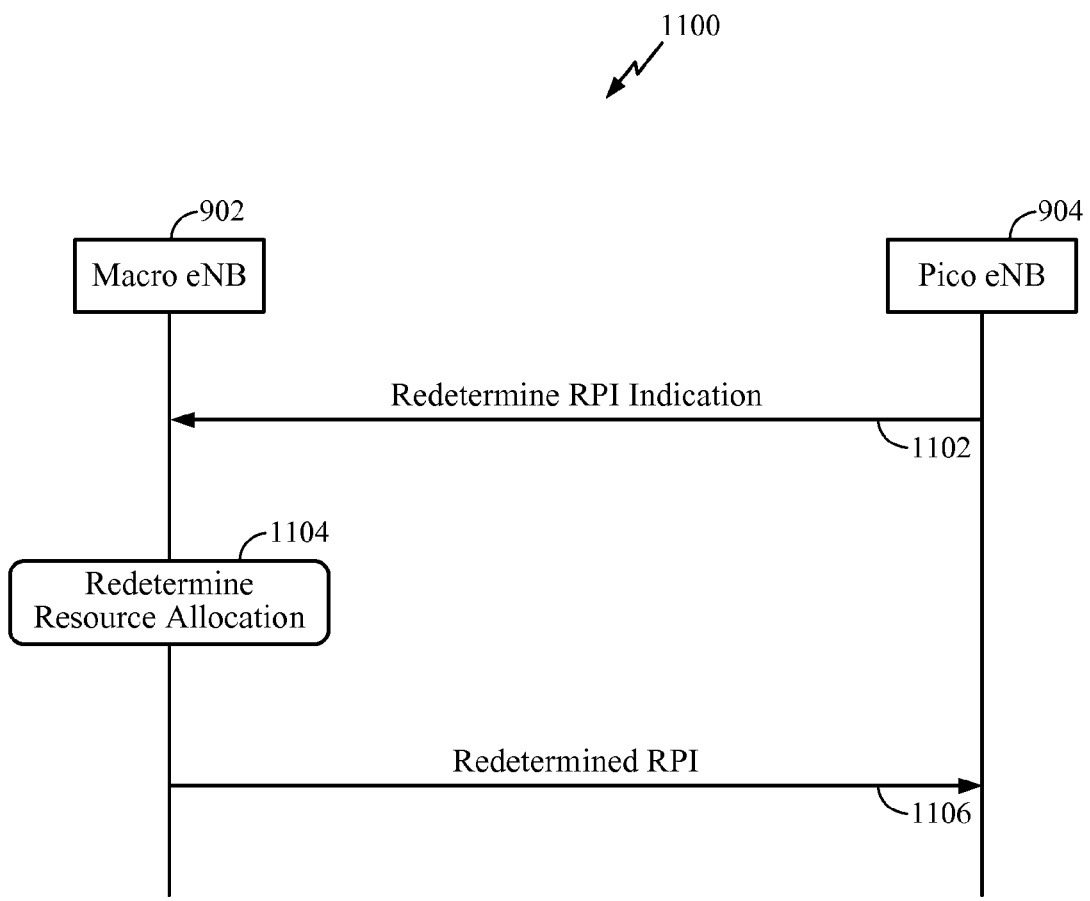
FIG. 11 illustrates an example call flow for sending a reset RPI message from a pico eNB to a macro eNB for the macro eNB to redetermine the RPI, in accordance with certain aspects of the present disclosure.

FIG. 11 illustrates an example call flow 1100 for sending an indication for a macro eNB 902 to redetermine its resource allocation, as described above. At 1102, a pico eNB 904 may send a redetermine RPI indication. The indication may comprise, for example, a usable ABS pattern, a flag in an ABS status IE, or an ABS without an ABS pattern information IE. For certain aspects, a first periodicity of sending the redetermine RPI indication is larger than a second periodicity of sending a resource status report (RSR). After receiving the redetermine RPI indication, the macro eNB 902 may redetermine its resource allocation at 1104 and transmit a redetermined RPI to the pico eNB 904 at 1106.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the drawings, those operations may have corresponding counterpart means-plus-function components with similar numbering.

For example, means for transmitting or means for sending may comprise an X2 backhaul interface or a transmitter, such as the modulator (MOD) 332 and antenna 334 of the eNB 110 depicted in FIG. 3. Means for receiving may comprise an X2 backhaul interface or a receiver, such as the demodulator (DEMOD) 332 and antenna 334 of the eNB 110 shown in FIG. 3. Means for processing, means for determining, means for adjusting, means for coordinating, or means for redetermining may comprise a processing system, which may include one or more processors, such as the controller/processor 340 of the eNB 110 illustrated in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
receiving, at a first base station, resource partitioning information (RPI) from at least one second base station, wherein the RPI comprises a bitmap of almost blank subframes (ABSs);
determining one or more resources indicated in the RPI usable by the first base station; and
sending, from the first base station to the at least one second base station, an indication of the usable resources.

2. The method of claim 1, wherein the sending comprises sending the indication of the usable resources along with a resource status report (RSR).

3. The method of claim 1, further comprising sending, from the first base station to the at least one second base station, a resource status report (RSR) before the receiving.

4. The method of claim 1, wherein the at least one second base station comprises two or more second base stations interfering with the first base station.

5. The method of claim 1, wherein the first base station is a pico base station and wherein the at least one second base station comprises at least one macro base station.

6. The method of claim 1, further comprising sending, from the first base station to the at least one second base station, another indication for the at least one second base station to redetermine the RPI.

7. The method of claim 6, wherein sending the other indication comprises periodically sending the other indication.

8. The method of claim 6, wherein the other indication comprises at least one of a usable almost blank subframe (ABS) pattern or a flag in an ABS status information element (IE).

9. The method of claim 8, wherein the flag indicates that the first base station prefers to retain the resources released by the at least one second base station.

10. A method for wireless communications, comprising:
receiving, at a first base station, resource partitioning information (RPI) from at least one second base station;
determining one or more resources indicated in the RPI usable by the first base station, wherein the at least one second base station comprises two or more second base stations, and wherein the determining comprises:
comparing the RPI received from the two or more second base stations; and
selecting a set of the resources common among the RPI received from the two or more second base stations; and
sending, from the first base station to the at least one second base station, an indication of the usable resources.

11. An apparatus for wireless communications, comprising:
means for receiving, at a first base station, resource partitioning information (RPI) from at least one second base station, wherein the RPI comprises a bitmap of almost blank subframes (ABSs);
means for determining one or more resources indicated in the RPI usable by the first base station; and
means for sending, from the first base station to the at least one second base station, an indication of the usable resources.

12. The apparatus of claim 11, wherein the means for sending is configured to send the indication of the usable resources along with a resource status report (RSR).

13. The apparatus of claim 11, further comprising means for sending, to the at least one base station, a resource status report (RSR) before the means for receiving receives the RPI.

14. The apparatus of claim 11, wherein the at least one base station comprises two or more base stations interfering with the apparatus.

15. The apparatus of claim 11, wherein the apparatus is a pico base station and wherein the at least one base station comprises at least one macro base station.

16. The apparatus of claim 11, further comprising means for sending, to the at least one base station, another indication for the at least one base station to redetermine the RPI.

17. The apparatus of claim 16, wherein the means for sending the other indication is configured to periodically send the other indication.

18. The apparatus of claim 16, wherein the other indication comprises at least one of a usable almost blank subframe (ABS) pattern or a flag in an ABS status information element (IE).

19. The apparatus of claim 18, wherein the flag indicates that the apparatus prefers to retain the resources released by the at least one base station.

20. An apparatus for wireless communications, comprising:
means for receiving, at a first base station, resource partitioning information (RPI) from at least one second base station;
means for determining one or more resources indicated in the RPI usable by the first base station, wherein the at least one base station comprises two or more base stations and wherein the means for determining is configured to:
compare the RPI received from the two or more base stations; and
select a set of the resources common among the RPI received from the two or more base stations; and
means for sending, from the first base station to the at least one second base station, an indication of the usable resources.

21. An apparatus for wireless communications, comprising:
a processing system configured to:
receive resource partitioning information (RPI) from at least one base station, wherein the RPI comprises a bitmap of almost blank subframes (ABSs);
determine one or more resources indicated in the RPI usable by the apparatus; and
send an indication of the usable resources to the at least one base station; and
a memory coupled to the processing system.

22. The apparatus of claim 21, wherein the processing system is configured to send the indication by sending the indication of the usable resources along with a resource status report (RSR).

23. The apparatus of claim 21, wherein the processing system is configured to send, to the at least one base station, a resource status report (RSR) before the processing system receives the RPI.

24. The apparatus of claim 21, wherein the at least one base station comprises two or more base stations interfering with the apparatus.

25. The apparatus of claim 21, wherein the apparatus is a pico base station and wherein the at least one base station comprises at least one macro base station.

26. The apparatus of claim 21, wherein the processing system is further configured to send, to the at least one base station, another indication for the at least one base station to redetermine the RPI.

27. The apparatus of claim 26, wherein the processing system is configured to send the other indication by periodically sending the other indication.

28. The apparatus of claim 26, wherein the other indication comprises at least one of a usable almost blank subframe (ABS) pattern or a flag in an ABS status information element (IE).

29. The apparatus of claim 28, wherein the flag indicates that the apparatus prefers to retain the resources released by the at least one base station.

30. An apparatus for wireless communications, comprising:
a processing system configured to:
receive resource partitioning information (RPI) from at least one base station;
determine one or more resources indicated in the RPI usable by the apparatus, wherein the at least one base station comprises two or more base stations and wherein the processing system is configured to determine the one or more resources by:
comparing the RPI received from the two or more base stations; and
selecting a set of the resources common among the RPI received from the two or more base stations; and
send an indication of the usable resources to the at least one base station; and
a memory coupled to the processing system.

31. A computer-program product for wireless communications, the computer-program product comprising:
a non-transitory computer-readable medium having code for:

receiving, at a first base station, resource partitioning information (RPI) from at least one second base station, wherein the RPI comprises a bitmap of almost blank subframes (ABSs);
determining one or more resources indicated in the RPI usable by the first base station; and
sending, from the first base station to the at least one second base station, an indication of the usable resources.

32. A method for wireless communications, comprising:
sending, from a first base station, resource partitioning information (RPI) to a second base station, wherein the RPI comprises a bitmap of almost blank subframes (ABSs);
receiving an indication of one or more resources indicated in the RPI usable by the second base station; and
determining whether to adjust the RPI based on the indication.

33. The method of claim 32, further comprising determining whether another base station is interfering with the second base station based on the indication of the usable resources.

34. The method of claim 32, wherein the receiving comprises receiving the indication of the usable resources along with a resource status report (RSR).

35. The method of claim 32, wherein the determining comprises:
determining a number of allocated resources indicated in the RPI;
determining a number of the usable resources; and
determining whether the number of the usable resources is smaller than the number of the allocated resources.

36. The method of claim 35, further comprising adjusting the RPI if the number of the usable resources is smaller than the number of the allocated resources.

37. The method of claim 36, wherein the adjusting comprises:
incrementing the number of the usable resources by 1; and
allocating resources indicated in the adjusted RPI such that the number of the allocated resources equals the incremented number of the usable resources.

38. The method of claim 32, further comprising sending another RPI from the first base station, wherein the other RPI is based on the usable resources.

39. The method of claim 32, wherein the first base station is a macro base station and wherein the second base station is a pico base station.

40. The method of claim 32, further comprising:
receiving, at the first base station from the second base station, another indication for the first base station to redetermine the RPI;
based on the reception of the other indication, redetermining the RPI; and
sending the redetermined RPI to the second base station.

41. The method of claim 40, wherein receiving the other indication comprises periodically receiving the other indication.

42. The method of claim 40, wherein the other indication comprises at least one of a usable almost blank subframe (ABS) pattern or a flag in an ABS status information element (IE).

43. The method of claim 40, further comprising deciding, based on the reception of the other indication, not to retract a resource from the redetermined RPI if the first base station has available resources.

44. An apparatus for wireless communications, comprising:

means for sending resource partitioning information (RPI) to a base station, wherein the RPI comprises a bitmap of almost blank subframes (ABSs);
means for receiving an indication of one or more resources indicated in the RPI usable by the base station; and
means for determining whether to adjust the RPI based on the indication.

45. The apparatus of claim 44, further comprising means for determining whether another base station is interfering with the base station based on the indication of the usable resources.

46. The apparatus of claim 44, wherein the means for receiving is configured to receive the indication of the usable resources along with a resource status report (RSR).

47. The apparatus of claim 44, wherein the means for determining is configured to:
determine a number of allocated resources indicated in the RPI;
determine a number of the usable resources; and
determine whether the number of the usable resources is smaller than the number of the allocated resources.

48. The apparatus of claim 47, further comprising means for adjusting the RPI if the number of the usable resources is smaller than the number of the allocated resources.

49. The apparatus of claim 48, wherein the means for adjusting is configured to:
increment the number of the usable resources by 1; and
allocate resources indicated in the adjusted RPI such that the number of the allocated resources equals the incremented number of the usable resources.

50. The apparatus of claim 44, wherein the means for sending the RPI is configured to send another RPI based on the usable resources.

51. The apparatus of claim 44, wherein the apparatus is a macro base station and wherein the base station is a pico base station.

52. The apparatus of claim 44, further comprising:
means for receiving, from the base station, another indication for the apparatus to redetermine the RPI;
means for redetermining the RPI based on the reception of the other indication, the RPI; and
means for sending the redetermined RPI to the base station.

53. The apparatus of claim 52, wherein the means for receiving the other indication is configured to periodically receive the other indication.

54. The apparatus of claim 52, wherein the other indication comprises at least one of a usable almost blank subframe (ABS) pattern or a flag in an ABS status information element (IE).

55. The apparatus of claim 52, further comprising means for deciding, based on the reception of the other indication, not to retract a resource from the redetermined RPI if the apparatus has available resources.

56. An apparatus for wireless communications, comprising:
a processing system configured to:
send resource partitioning information (RPI) to a base station, wherein the RPI comprises a bitmap of almost blank subframes (ABSs);
receive an indication of one or more resources indicated in the RPI usable by the base station; and
determine whether to adjust the RPI based on the indication; and
a memory coupled to the processing system.

57. The apparatus of claim 56, wherein the processing system is configured to determine whether another base station is interfering with the base station based on the indication of the usable resources.

58. The apparatus of claim 56, wherein the processing system is configured to receive the indication of the usable resources along with a resource status report (RSR).

59. The apparatus of claim 56, wherein the processing system is configured to determine whether to adjust the RPI by:
  determining a number of allocated resources indicated in the RPI;
  determining a number of the usable resources; and
  determining whether the number of the usable resources is smaller than the number of the allocated resources.

60. The apparatus of claim 59, wherein the processing system is configured to adjust the RPI if the number of the usable resources is smaller than the number of the allocated resources.

61. The apparatus of claim 60, wherein the processing system is configured to adjust the RPI by:
  incrementing the number of the usable resources by 1; and
  allocating resources indicated in the adjusted RPI such that the number of the allocated resources equals the incremented number of the usable resources.

62. The apparatus of claim 56, wherein the processing system is configured to send another RPI based on the usable resources.

63. The apparatus of claim 56, wherein the apparatus is a macro base station and wherein the base station is a pico base station.

64. The apparatus of claim 56, wherein the processing system is further configured to:
  receive, from the base station, another indication for the apparatus to redetermine the RPI;
  redetermine the RPI based on the reception of the other indication; and
  send the redetermined RPI to the base station.

65. The apparatus of claim 64, wherein the processing system is configured to receive the other indication by periodically receiving the other indication.

66. The apparatus of claim 64, wherein the other indication comprises at least one of a usable almost blank subframe (ABS) pattern, a flag in an ABS status information element (IE), or an ABS without an ABS pattern information IE.

67. The apparatus of claim 64, further comprising wherein the processing system is configured to decide, based on the reception of the other indication, not to retract a resource from the redetermined RPI if the apparatus has available resources.

68. A computer-program product for wireless communications, the computer-program product comprising:
  a non-transitory computer-readable medium having code for:
    sending, from a first base station, resource partitioning information (RPI) to a second base station, wherein the RPI comprises a bitmap of almost blank subframes (ABSs);
    receiving an indication of one or more resources indicated in the RPI usable by the second base station; and
    determining whether to adjust the RPI based on the indication.

* * * * *